(12) United States Patent
Haase et al.

(10) Patent No.: US 10,938,804 B2
(45) Date of Patent: Mar. 2, 2021

(54) METHOD FOR OPERATING A FIELD DEVICE OF AUTOMATION TECHNOLOGY AND AN OPERATING UNIT FOR CARRYING OUT THE METHOD

(71) Applicant: Endress+Hauser Conducta GmbH+Co. KG, Gerlingen (DE)

(72) Inventors: Björn Haase, Stuttgart (DE); Ralf Schmidt, Kembs (FR); Markus Kilian, Merzhausen (DE); Helmut Kalteis, Marktoberdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 258 days.

(21) Appl. No.: 15/938,203

(22) Filed: Mar. 28, 2018

(65) Prior Publication Data
US 2018/0288039 A1   Oct. 4, 2018

(30) Foreign Application Priority Data

Mar. 29, 2017 (DE) .................. 10 2017 106 777.9

(51) Int. Cl.
*G06F 7/04* (2006.01)
*H04L 29/06* (2006.01)
*G06F 15/16* (2006.01)

(52) U.S. Cl.
CPC ........ *H04L 63/0853* (2013.01); *H04L 63/062* (2013.01); *H04L 63/0823* (2013.01);
(Continued)

(58) Field of Classification Search
CPC ............. H04L 63/0428; H04L 63/0435; H04L 63/0442; H04L 63/062; H04L 63/0823;
(Continued)

(56) References Cited

U.S. PATENT DOCUMENTS

| 7,010,366 B2 * | 3/2006 | Konrad ................... G01D 7/06 700/108 |
| 10,271,207 B2 * | 4/2019 | Haase ................. H04L 63/0442 |

(Continued)

FOREIGN PATENT DOCUMENTS

| CN | 104468124 A | 3/2015 |
| CN | 105744524 A | 7/2016 |

(Continued)

OTHER PUBLICATIONS

Search Report for German Patent Application No. 10 2017 106 777.9, German Patent Office, dated Dec. 8, 2017, 9 pp.
(Continued)

*Primary Examiner* — Gary S Gracia
(74) *Attorney, Agent, or Firm* — Mark A. Logan; Endress+Hauser (USA) Holding Inc.

(57) ABSTRACT

The disclosure relates to a method for operating a field device of automation technology, comprising: establishing a wireless and/or wired communications link between the field device and an operating unit; establishing a communications link between an authentication card and the field device, using the operating unit, wherein at least the field device and the authentication card contain symmetric or asymmetric key information; and carrying out an at least unilateral authentication of the authentication card on the field device, as well as an operating unit for carrying out the method according to the invention.

22 Claims, 2 Drawing Sheets

(52) U.S. Cl.
CPC ........ *H04L 63/108* (2013.01); *H04L 63/0428* (2013.01); *H04L 63/0435* (2013.01); *H04L 63/0442* (2013.01); *H04L 63/083* (2013.01); *H04L 63/126* (2013.01)

(58) Field of Classification Search
CPC .............. H04L 63/083; H04L 63/0853; H04L 63/108; H04L 63/126
See application file for complete search history.

(56) References Cited

U.S. PATENT DOCUMENTS

| | | | |
|---|---|---|---|
| 2010/0063604 A1* | 3/2010 | Kilian | H04L 12/40 700/79 |
| 2010/0306436 A1* | 12/2010 | Kilian | G05B 19/042 710/301 |
| 2013/0201316 A1* | 8/2013 | Binder | H04L 67/12 348/77 |
| 2014/0006574 A1* | 1/2014 | Fischer | H04L 63/20 709/221 |
| 2014/0089501 A1* | 3/2014 | Hoferlin | H04W 64/00 709/224 |
| 2014/0281480 A1 | 9/2014 | Petty | |
| 2014/0358257 A1* | 12/2014 | Fries | G05B 19/0426 700/86 |
| 2014/0364963 A1* | 12/2014 | Lovell | G05B 15/02 700/2 |
| 2015/0177707 A1* | 6/2015 | Girardey | G05B 9/03 700/79 |
| 2015/0296619 A1* | 10/2015 | Rooyakkers | H01R 13/5841 361/760 |
| 2016/0063785 A1* | 3/2016 | Benkert | H04L 63/0869 340/5.23 |
| 2016/0104979 A1* | 4/2016 | Korn | H04W 12/00 439/620.21 |
| 2016/0224048 A1* | 8/2016 | Rooyakkers | H02J 7/0047 |
| 2017/0171746 A1* | 6/2017 | Haase | G06F 21/606 |

FOREIGN PATENT DOCUMENTS

| | | |
|---|---|---|
| DE | 102014112611 A1 | 3/2016 |
| EP | 1535247 B1 | 7/2010 |

OTHER PUBLICATIONS

Wikipedia, Mobile Identity Management, https://en.wikipedia.org/w/index.php?title=Mobile_identity_management&oldid=772604161, 2 pp. (last updated Mar. 28, 2017).

Wikipedia, Digitale Signatur, https://en.wikipedia.org/w/index.php?title=Digitale_Signatur&oldid=163217000, 2 pp. (last updated Mar. 3, 2017).

* cited by examiner

METHOD FOR OPERATING A FIELD DEVICE OF AUTOMATION TECHNOLOGY AND AN OPERATING UNIT FOR CARRYING OUT THE METHOD

CROSS-REFERENCE TO RELATED APPLICATION

The present application is related to and claims the priority benefit of German Patent Application No. 10 2017 106 777.9, filed on Mar. 29, 2017, the entire contents of which are incorporated herein by reference.

TECHNICAL FIELD

The invention relates to a method for operating a field device of automation technology, as well as to an operating unit for carrying out the method according to the invention.

BACKGROUND

Field devices that are used in industrial installations are already known from the prior art. Field devices are often used in process automation, as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices are produced and marketed by the Endress+Hauser group.

In modern industrial plants, field devices are usually connected via communications networks, such as fieldbuses (Profibus®, FOUNDATION® Fieldbus, HART®, etc.), to higher-level units. Higher-level units are control units, such as an SPS (storage programmable controller) or a PLC (programmable logic controller). The higher-level units are used for, among other things, process control, as well as for commissioning of the field devices. The measured values detected by the field devices—in particular, by sensors—are transmitted via the respective bus system to a (or possibly several) higher-level unit(s) that further process the measured values, as appropriate, and relay them to the control station of the plant. The control station is used for process visualization, process monitoring, and process control via the higher-level units. In addition, a data transfer is also required from the higher-level unit via the bus system to the field devices—in particular, for configuration and parameterization of field devices, as well as for control of actuators.

In this case, the control centers generally have interfaces to a further level—the so-called manufacturing execution system (MES)—in which the focus is on commercial and logistical processes. At the MES level, the users generally work with conventional PC hardware. Known and customary at this level are also access control systems and databases for user administration, via which the login on the work PC's, for example, is controlled and administered.

Fieldbuses have only limited capabilities with respect to communications bandwidth, message-forwarding, routing, etc., and are therefore generally exposed to only a minor extent to attacks by unauthorized parties, such as so-called "hacker" attacks. For this reason, a device lock for the "operator," who must be on-site, is, in many cases, not required, or a short password—for example, in the form of a PIN code—used identically for several devices, is completely sufficient. The field devices can be unlocked by entering this password, or specific operating functions of the field device can be activated, i.e., from this point in time, changes to the configuration/parameterization of the field device are possible, for example.

These simplest authentication methods used in the prior art so far are in many cases no longer adequate when using the IP- or radio-based communication methods increasingly integrated into field devices. For security reasons, long, individual operator passwords are therefore required, for example. This type of access method, however, makes the manageability or the usability complicated for the user, which ultimately involves the risk of such security measures being circumvented. This is, in particular, the case when not only individual user passwords, but also individual field device passwords are required for security reasons. In addition, the problem exists, for example, of how a password change and password administration can be practically and efficiently carried out in an installation with a large number of field devices.

In the field of "access control," chip card systems (also called authentication card systems), such as employee authentication cards (so-called "badges") and gate cards, are known. These systems can be designed to be contactless or contact-based and comprise, in addition to an electronic storage medium and a communications interface, which is designed to be inductive or contact-based, a computing unit that can perform cryptographic arithmetic operations. By means of these systems, an operator can easily and without passwords be granted or denied access to areas, e.g., rooms, in an organization. Similar chipsets are also used in identification documents, such as the German identification card.

These chip card systems at the same time offer flexible administration of the authorization, e.g., the exclusive granting of access to selected rooms within the organization, or access restrictions at certain points in time. In many cases, they further comprise hardware that can be programmed specifically for the application and allows access to the computing unit.

It is essential for this login to note that the chip card systems in these cases comprise a computing unit, a communications interface, and a persistent storage unit. For example, in an electronic identification card, a password and a cryptographic key are stored in this storage unit. The interface is used for the supply of power, and the computing unit implements cryptographic protocols, which serve to verify the password or key, for example. The essential difference between security cards and conventional digital electronics consists in a high level of protection against unauthorized reading and attacks against the hardware on so-called bypass channels. It is, for example, prevented that conclusions about the passwords and keys stored in the security card can be drawn via an analysis of the radiation or the power consumption profile.

Furthermore, so-called cryptographic certificates are known from the prior art. These are digital files, in which information fields with all kinds of content are provided with a digital signature, and the digital signature was calculated using a private key of a private/public key pair. Via this signature, the signing body generally confirms that the correctness of the content of the data field was verified.

In many cases, said chip card systems require a high quantity of electrical power for communication and cryptography calculation, e.g., a current of 40 mA at 3.3 V for 1 second of computing time.

Use of such chip card systems for authentication in connection with field devices has not been possible so far, since the energy budget of industrial field devices does not permit the use of such chip cards. In the industrial sector, maximum supply powers in the range of 50 mW per field device are typically available. Especially in the hazardous area of a plant, the available electrical power is even more limited. For example, an energy budget of typically only 5 mW is thus available for the main computing unit of a field device. The storage budget of such a field device is also very limited. Such a power-limited computing unit therefore, possibly, does not allow complex cryptographic calculations, as these are used, for example, according to the nowadays typical IT security standard RSA for smart cards.

Furthermore, the installation of reading devices for the chip cards in special housings of the field devices, e.g., in hygienic housings, is, structurally, not possible, or only possible with difficulty.

Even in cases in which a connection to a smart card in a field device is technically feasible, limitations in the data interface to the control center frequently do not allow access to a central user rights administration.

SUMMARY

Proceeding from this problem, the invention is based upon the aim of providing a method and an operating unit that allow improvement in the security of a field device in an efficient manner.

The aim is achieved by a method for operating a field device of automation technology, comprising:
  Establishing an—in particular, wireless and/or wired—communications link between the field device and an operating unit;
  Establishing a communications link between the authentication card and the field device, using the operating unit, wherein at least the field device and the authentication card contain symmetric or asymmetric key information; and
  Carrying out an at least unilateral authentication of the authentication card on the field device.

The advantage of the method according to the invention consists in an operator being able to easily and efficiently authenticate himself to a field device. For this purpose, the operator needs two components: an operating unit and an authentication card.

The operating unit is, for example, a hand-held configuration device, such as Field Xpert, which is produced and marketed by the applicant. It may, for example, also be a PC or a laptop. It is, in particular, a mobile terminal device, such as a tablet or a smartphone, or a wearable, such as a smartwatch. The operating unit must have an interface designed to communicate with the authentication card, in order to be able to read the latter.

The authentication card is a chip card—in particular, a smart card. Examples of such chip cards are already mentioned by way of example in the introductory part of the description.

Another advantage of the invention consists in the authentication card not communicating directly with the field device, but this communication being carried out via the operating unit. If this communication—in particular, a reading of the authentication card—is based upon a wireless communications link, the electrical power required for this purpose is supplied by the operating unit. The field device therefore does not need an increased power supply, which is why the method according to the invention can be carried out with almost any commercially available field device that is suitable for a communications link with the operating unit.

A wired communications link between the field device and operating unit is understood to be, for example, a cable connection with the service interface, which is called CDI interface in the field devices of the applicant. It may, however, also be a fieldbus of automation technology, e.g., HART, Foundation Fieldbus, Profibus, etc., or an IT communications network—for example, Ethernet.

Field devices that are mentioned in connection with the method according to the invention are already given as examples in the introductory part of the description.

An advantageous embodiment of the method according to the invention provides that an authenticated and encrypted session be established after the authentication card has been successfully authenticated on the field device, wherein data are exchanged between the operating unit and the field device during this session—for example, using protocols like AES128GCM or alternative authenticated encryption methods, such as are currently in the security assessment in the CAESAR competition.

A first variant of the method according to the invention provides that an asymmetric cryptography be used as authentication, wherein the authentication comprises the transmission of a first certificate, by means of the operating unit, from the authentication card to the field device, as well as a verification of the validity of the first certificate, by verifying a signature, by means of a public key stored in the field device. The asymmetric cryptography is based, in particular, upon elliptical curves.

An advantageous embodiment of the first variant of the method according to the invention provides that the first certificate contain key information that allows for the at least unilateral authentication of the card on the field device, and a cryptographic authentication protocol verify the authenticity of the card by means of the key information stored in the first certificate.

A second variant of the method according to the invention provides that a symmetric cryptography be used as authentication and wherein the authentication of the card on the field device be carried out by means of a symmetric authentication protocol with the aid of the key information contained in the field device in the form of at least one cryptographic key.

An advantageous development of the method according to the invention provides that an at least unilateral authentication of the field device on the operating unit be additionally carried out.

A preferred embodiment of the method according to the invention provides that an asymmetric cryptography be used as authentication, wherein the operating unit reads a second certificate, which is contained on the field device and, in particular, stored on the field device within the course of the production or the bringing into service of the industrial installation, and authenticates the field device by means of the second certificate, wherein the second certificate contains key information that allows for an at least unilateral authentication of the field device on the operating unit, and a cryptographic authentication protocol verifies the authenticity of the field device by means of the key information stored in the second certificate.

An alternative embodiment of the method according to the invention provides that a symmetric cryptography be used as authentication and wherein the authentication of the field device on the operating unit be carried out by means of a symmetric authentication protocol.

An advantageous development of the method according to the invention provides that an at least unilateral authentication of the authentication card on the operating unit be additionally carried out.

A preferred embodiment of the method according to the invention provides that an asymmetric cryptography be used as authentication, wherein the operating unit reads the first certificate contained on the authentication card or a third certificate and authenticates the field device by means of the first or the third certificate in that a cryptographic authentication protocol verifies the authenticity of the authentication card by means of the key information stored in the first or in the third certificate.

An alternative embodiment of the method according to the invention provides that a symmetric cryptography be used as authentication and wherein the authentication of the field device on the operating unit be carried out by means of a symmetric authentication protocol.

A preferred embodiment of the method according to the invention provides that a password be entered on the operating unit as a sub-component of the authentication. This step increases security.

A preferred development of the method according to the invention provides that at least one operating function, linked to the authentication card, of the field device be authorized or activated after successful authentication, wherein the information about the operating functions to be activated is contained in a data field of the first certificate.

An advantageous embodiment of the method according to the invention provides that a central database, connected to the field device in a communications link via a second wireless or wired communications network, determine the operating function of the field device to be authorized or activated.

Operating functions are, in particular, understood to mean the display or reading of current and/or stored, past measured values and/or envelope curves and the display or reading of current and/or stored diagnostic messages or even parameterization functions. Operation takes place directly via the operating unit, but may also, for example, take place via the display of the field device, via device keys on the housing of the field device or keys arranged inside the housing of the field device, or via a service interface of the field device. Parameterization functions are, in particular, understood to mean functions for displaying and changing the parameter values of the field device.

Said central database is, for example, implemented in a computing unit or in a server—in particular, at the MES level. The second communications network is, for example, a fieldbus of automation technology. In such a case, the database may be arranged in the control level of the installation and be implemented in a higher-level unit, for example. In the case where the second communications network is designed to be wireless, it is, in particular, a GSM, UMTS, LTE, 5G, etc.

Alternatively, the second communications network is the internet, or a network that is based upon internet protocols and that allows access to the internet or a so-called intranet internal to the plant. The database may in this case also be located outside the installation. The database is, in particular, designed to be cloud-enabled, if it can be contacted via the internet.

A preferred embodiment of the method according to the invention provides that an at least unilateral authentication of the database be carried out on the field device—in particular, using an asymmetric cryptography. In this case, it can also be ensured in this way that it is the provided secure database, and not a manipulated unit.

An advantageous embodiment of the method according to the invention provides that the reading of the first certificate from the authentication card take place by means of the operating unit in a contactless manner—in particular, by means of a radio link—or by means of a contact—in particular, by means of an integrated card reader or a card reader designed as an additional module. The contactless reading of the first certificate takes place, in particular, by means of RFID or NFC. It may in this case also be provided that the authentication card be designed in the form of a SIM card.

A preferred development of the method according to the invention provides that, for the activation of the at least one operating function, linked to the permission level, of the field device or within the scope of at least one of the authentications, a password, a pin, or a transaction number has to be entered additionally, or that a switch or button on the field device has to be operated additionally. This increases the security for the authorized activation of the permission level.

Another preferred development of the method according to the invention provides that the validity of the certificate can be successfully checked only within a defined period of time, wherein the respective certificate outside of the defined period of time is invalidated. In this case, it may be provided that different periods of time be respectively defined for the respective certificates or that the periods of time be defined only for selected certificates.

An advantageous embodiment of the method according to the invention provides that the authentication card be integrated into the mobile unit beforehand. For this purpose, it may be provided that the authentication card be directly integrated into the electronic module of the operating unit as an electronic module and be designed to be writable.

An alternative advantageous embodiment of the method according to the invention provides that the authentication card be integrated into an article of clothing or into a tool beforehand. The article of clothing may, for example, be a helmet or a glove. It may, for example, be any article of clothing or tool of a service technician, which he carries when entering the plant.

A preferred embodiment of the method according to the invention provides that a lattice-based authentication method or a fully homomorphic encryption system be used as asymmetric cryptography. This class of methods allows for outsourcing complex calculations, which the field device itself is not able to perform, to the operating unit, without cryptographic attacks becoming possible. It is thus possible to delegate cryptography calculations. This is, in particular, then advantageous when attacks with quantum computers become practicable and make significantly more elaborate algorithms for cryptographic protection necessary.

The aim is, moreover, achieved by an operating unit designed to carry out the method according to the invention.

BRIEF DESCRIPTION OF THE DRAWINGS

The invention is explained in greater detail with reference to the following figures. Illustrated are.

DETAILED DESCRIPTION

Figure 1:
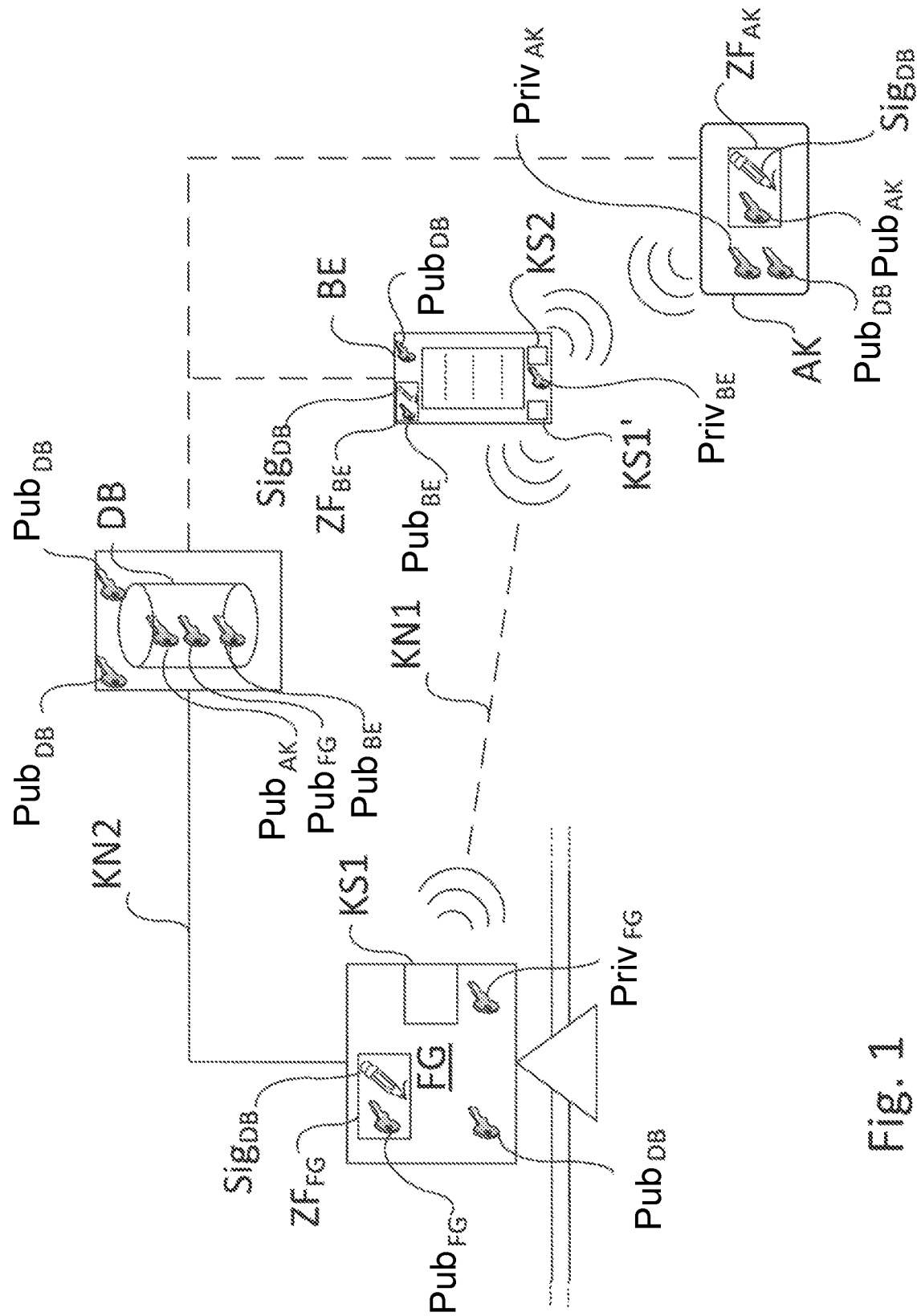
FIG. 1: a schematic overview of an application example of the method according to the invention.

FIG. 1 shows a schematic overview of an application example of the method according to the invention. A field device FG is shown, which is placed into a measuring station of a process installation. The field device FG is a field device of process automation for measuring a process variable, such as the pressure or the flow-rate value in a pipe. Additional applications of such a field device FG have already been explained in detail in the introductory part of the description. The field device has a first communications interface KS1 designed—for example, wirelessly—for connecting to an operating unit BE, which also has a first communications interface KS1' corresponding to the first communications interface KS1 of the field device FG. The field device FG and the operating unit BE communicate via the first communications interfaces KS1, KS1' by way of a first communications network KN1. The first communications network KN1 is, for example, designed according to the Bluetooth or WLAN standard. Alternatively, the first communications network KN1 is designed to be wired.

The operating unit BE has a second communications interface KS2 for connecting to an authentication card AK, based, for example, upon a standard such as RFID or near-field communications (NFC), or another customary wireless standard for authentication cards AK. The operating unit BE may, alternatively, also have an externally- or internally-connected card reader serving as second communications interface KS2.

In the installation, an IVIES system is present, in which a central database DB for administering access and/or key data is available.

The following description refers to an exemplary embodiment based upon asymmetric cryptography and certificates $ZF_{FG}$, $ZF_{AK}$, and $ZF_{BE}$. This variant has advantages with respect to security, but requires much computing power in comparison. When dispensing with the protection against various attacks, symmetric encryption may, alternatively, also be used.

All sub-components (field device FG, authentication card AK, central database DB) have a private cryptographic key $Priv_{DB}$, $Priv_{FG}$, $Priv_{AK}$, $Priv_{BE}$ and an associated public key $Pub_{DB}$, $Pub_{FG}$, $Pub_{AK}$, $Pub_{BE}$.

Advantageously, the public key $Pub_{DB}$ of the central database DB is persistently stored in the field device FG, in the operating unit BE, and in the authentication card AK when bringing the respective component FG, BE, AK into service in the installation. The database itself contains a copy of the public key $Pub_{FG}$, $Pub_{AK}$, $Pub_{BE}$ of the sub-components FG, BE, AK, in order to be able to authenticate these sub-components FG, BE, AK to the database DB.

When being brought into service, the sub-components FG, BE, AK furthermore receive certificates $ZF_{FG}$, $ZF_{AK}$, $ZF_{BE}$, in which are stored the respective public key $Pub_{FG}$, $Pub_{AK}$, $Pub_{BE}$, and signatures $Sig_{DB}$, which were created by means of the private key $Priv_{DB}$ of the database DB.

In the case of the authentication card AK or the operating unit BE, authorization information regarding the scope or the permission level of the access grant is advantageously stored in the respective certificate $ZF_{AK}$, $ZF_{BE}$. Operating functions may thus be activated on the field device FG, contingent upon successful authentication. Whether operating functions are activated or which operating functions are activated is defined in said permission level of the access grant. With the aid of these levels, different user groups (junior, senior, etc.), which have different permission levels from one another, may also be defined.

The certificates $ZF_{FG}$, $ZF_{AK}$, $ZF_{BE}$ advantageously also contain expiration dates. Once the expiration date has passed, a respective certificate $ZF_{FG}$, $ZF_{AK}$, $ZF_{BE}$ is invalidated.

Cryptographic authentication protocols that ensure that all involved sub-components FG, BE, AK belong to the installation are thus possible. In this case, the authentication usually comprises two steps. In addition to checking the respective certificate $ZF_{FG}$, $ZF_{AK}$, $ZF_{BE}$ by means of the public key $Pub_{DB}$ of the central database DB, which is respectively transmitted to the sub-components FG, BE, AK and persistently stored when bringing them into service, an authentication protocol between the sub-components FG, BE, AK involved in the authentication check is usually also used.

In the case of the authentication card AK, information about a password may also be stored on the authentication card AK, allowing a password verification via a cryptographic protocol, such as by using an augmented, password-authenticated key exchange protocol. Such protocols are integrated into many authentication cards, e.g., also in German identification cards—the so-called PACE (Password-Authenticated Connection Establishment) protocol.

Figure 2:
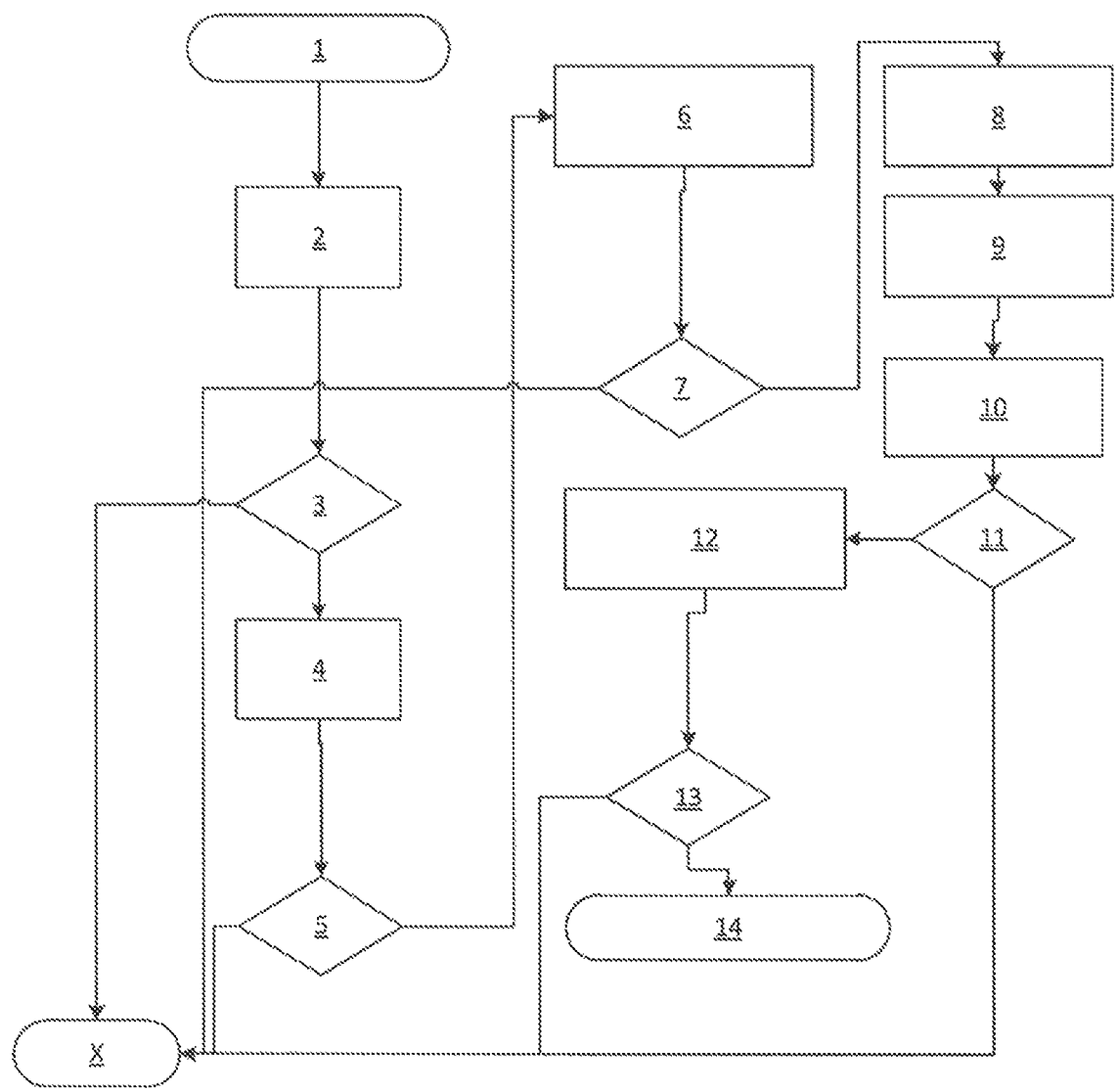
FIG. 2: an exemplary embodiment of a flowchart of the method according to the invention.

FIG. 2 shows an exemplary embodiment of a flowchart. The numbers in parentheses indicate the respectively-performed method steps. In this exemplary embodiment, after establishing a connection (1) to the field device FG, by means of the public key of the central database and the private key $Priv_{DB}$, contained in the certificate $ZF_{FG}$ of the field device FG, of the central database DB, the operating unit BE first checks whether the field device FG is authentic and belongs to the installation (3). For this purpose, first, the certificate $ZF_{FG}$ is transmitted to the operating unit BE (2).

If the certificate $ZF_{FG}$ is not correct, the process is aborted (x). If the certificate $ZF_{FG}$ is correct, the operating unit BE transmits a random number to the field device FG and has the field device sign this random number (4). The operating unit BE subsequently checks the signature generated by the field device FG for correctness (5). If it is not correct, the process is aborted (x).

If this signature is correct, the field device FG subsequently checks whether an authentication card AK is available. If so, the authentication card AK is authenticated on the field device FG. For this purpose, the field device FG requests the certificate $ZF_{AK}$ and the public key $Pub_{AK}$ of the authentication card AK (6). The certificate $ZF_{AK}$ contains the private key $Priv_{AK}$ of the authentication card AK and information regarding the operating functions to be activated of the field device FG. The field device FG subsequently checks the certificate $ZF_{AK}$ for correctness (7). If it is not correct, the process is aborted (x).

If it is correct, the authentication card AK, if required, requests a password verification (8). For this purpose, the operator enters the password into the operating unit BE (9). In the process, the authentication card AK and the operating unit BE execute a password verification protocol. The correctness of the password verification between the operating unit BE and the authentication card AK is confirmed to the field device FG via a cryptographic protocol. For this purpose, if necessary, the PACE protocol is used (10), and the result is checked for correctness (11). If it is correct, the field device FG transmits a random number to the authentication card AK and has the authentication card sign this random number in order to confirm the successful password verification (12). The field device FG, lastly, checks the signature of the random number for correctness (13). If correctness cannot be successfully verified, the process is aborted (x). If correctness can be successfully verified, a secure session between the field device FG and the operating unit BE is established, and the functions of the field device FG defined on the authentication card AK are, if necessary, activated on the operating unit BE (14).

Only if all required mutual authentications are successfully completed is a session key between the operating unit BE and the field device FG generated and a so-called session established, and one or more operating functions of the field device FG, if necessary, activated on the operating unit BE (14). It is thus virtually impossible for an unauthorized party to operate the field device FG without authentic sub-components BE, AK and without knowing the password.

In the present example, authentication comprises
an authentication of the field device FG on the operating unit BE,
an authentication of the operator/operating unit BE (via password) on the authentication card, and
an authentication of the authentication card AK, i.e., implicitly, of the operator, on the field device FG.

According to the invention, other combinations of the mutual authentication are also possible. For example, it may be required to additionally authenticate the operating unit BE on the field device FG or to dispense with the authentication of the field device FG on the operating unit BE, as shown in FIG. 2, or with the password verification component. The person skilled in the art will select the necessary combination of authentication methods according to the security requirements of the specific application. Advantageously, a protocol that generates a session key directly as a result of the authentication process is used for authentication.

It is essential for the method according to the invention that, from the point of view of the user, the authentication card AK and/or the password must be presented, in order to be able to successfully establish a session between the field device FG and the operating unit BE. Especially when dispensing with a password, a greater ease of use, in combination with a very high degree of security, may thus be made possible.

In an advantageous development, one of the sub-components, e.g., the field device FG, also exchanges information directly with the database DB—for example, in order to additionally check the correctness of a certificate $ZF_{FG}$, $ZF_{AK}$, $ZF_{BE}$, or in order to obtain authorization information or operating functions of the field device FG to be activated.

The invention claimed is:

1. A method for operating a field device of automation technology, comprising:
   providing an authentication card, the authentication card including a computing unit embodied to perform cryptographic arithmetic operations, a non-volatile memory, and a communication interface, wherein the communication interface is embodied to receive electrical energy to operate the computing unit, the non-volatile memory, and the communication interface;
   providing an operating unit, including:
      a first communication interface embodied to communicate with the field device; and
      a second communication interface embodied to communicate with the authentication card and further embodied to supply electrical energy to the authentication card;
   establishing a communications link between the field device and the operating unit via the first communication interface of the operating unit;
   establishing a communications link between the operating unit and the authentication card via the second communication interface of the operating unit, whereby electrical power is supplied from the operating unit to the authentication card;
   establishing a communications link between the authentication card and the field device via the operating unit, wherein at least the field device and the authentication card each contain symmetric or asymmetric key information; and
   executing at least a unilateral authentication of the authentication card on the field device, wherein the authentication is based on symmetric or asymmetric cryptography.

2. The method according to claim 1, further comprising:
   establishing an authenticated and encrypted session after the authentication card has been successfully authenticated on the field device; and
   exchanging data between the operating unit and the field device during the authenticated and encrypted session.

3. The method according to claim 1,
   wherein an asymmetric cryptography is used in the unilateral authentication,
   wherein the unilateral authentication includes:
      transmitting a first certificate from the authentication card to the field device via the operating unit; and
      verifying a validity of the first certificate by verifying a signature using a public key stored in the field device, and
   wherein the first certificate is valid for only a defined period of time and is invalid outside of the defined period of time.

4. The method according to claim 3, wherein the first certificate contains key information enabling the unilateral authentication of the authentication card on the field device using a cryptographic authentication protocol and the key information in the first certificate.

5. The method according to claim 4, further comprising:
   executing at least a unilateral authentication of the authentication card on the operating unit.

6. The method according to claim 5, wherein the asymmetric cryptography is used in the unilateral authentication of the authentication card on the operating unit, wherein the unilateral authentication of the authentication card on the operating unit includes the operating unit reading the first certificate from the authentication card or a third certificate and authenticating the authentication card using the first certificate or the third certificate and a cryptographic authentication protocol and the key information in the first certificate or in the third certificate.

7. The method according to claim 5, wherein a symmetric cryptography is used in the unilateral authentication of the authentication card on the operating unit and wherein the authentication of the authentication card on the operating unit is carried out using a symmetric authentication protocol.

8. The method according to claim 5, further comprising:
entering a password on the operating unit as a step of the unilateral authentication of the authentication card on the operating unit.

9. The method according to claim 3, further comprising:
authorizing or activating at least one operating function of the field device after a successful unilateral authentication of the authentication card, wherein information about the at least one operating function is contained in a data field of the first certificate.

10. The method according to claim 9, wherein the authorizing or activating includes accessing a central database connected to the field device by a communications link via a second wireless or wired communications network, wherein the information about the at least one operating function is contained in the central database.

11. The method according to claim 10, further comprising:
executing at least a unilateral authentication of the central database on the field device using the asymmetric cryptography.

12. The method according to claim 3, wherein the transmission of the first certificate from the authentication card includes a contactless transmission using a radio link or includes a contacted transmission using an integrated card reader or a card reader designed as an additional module.

13. The method according to at least one of claim 3, wherein the asymmetric cryptography includes a lattice-based authentication method or a fully homomorphic encryption system.

14. The method according to claim 1, wherein a symmetric cryptography is used in the unilateral authentication, and wherein the unilateral authentication of the authentication card on the field device is carried out using a symmetric authentication protocol with the aid of the key symmetric information in the field device in the form of at least one cryptographic key.

15. The method according to claim 1, further comprising:
executing on the operating unit at least a unilateral authentication of the field device.

16. The method according to claim 15, wherein an asymmetric cryptography is used in the unilateral authentication of the field device,
wherein the unilateral authentication of the field device includes the operating unit reading a second certificate contained on the field device and stored on the field device during production of the field device and authenticating the field device using the second certificate,
wherein the second certificate contains key information enabling the unilateral authentication of the field device on the operating unit using a cryptographic authentication protocol and the key information in the second certificate, and
wherein the second certificate is valid for only a defined period of time and is invalid outside of the defined period of time.

17. The method according to claim 15, wherein a symmetric cryptography is used in the unilateral authentication of the field device and wherein the unilateral authentication of the field device on the operating unit is carried out using a symmetric authentication protocol.

18. The method according to claim 1, wherein the unilateral authentication includes an entry of a password, a PIN, or a transaction number or includes an operation of a switch or button, and
wherein a successful unilateral authentication activates at least one operating function of the field device linked to a permission level.

19. The method according to claim 1, wherein the authentication card is integrated into the operating unit.

20. The method according to claim 1, wherein the authentication card is integrated into an article of clothing or into a tool.

21. The method according to claim 1,
wherein an asymmetric cryptography is used in the unilateral authentication, and
wherein the unilateral authentication includes:
generating a random data in the field device and transmitting the random data to the authentication card;
signing the random data in the authentication card using a private key of the authentication card;
returning the signed random data from the authentication card to the field device; and
verifying the signed random data in the field device using the public key of the authentication card.

22. An operating unit, comprising:
a microcontroller and an associated memory;
a user interface including a display and a keyboard;
a first communication interface embodied to communicate with a field device; and
a second communication interface embodied to communicate with an authentication card and further embodied to supply electrical energy to the authentication card,
wherein the operating unit is configured to:
establish a communication link with the field device via the first communication interface;
establish a communications link the authentication card via the second communication interface, whereby electrical power is supplied from the operating unit to the authentication card;
establish a communication link between an authentication card and the field device via the operating unit;
establish an authenticated and encrypted session between the authentication card and the field device via the operating unit and transfer a first certificate from the authentication card to the field device via the operating unit;
perform a unilateral authentication of the field device using asymmetric cryptography, including reading a second certificate from the field device and authenticating the field device using the second certificate, or perform a unilateral authentication of the field device using symmetric cryptography;
perform a unilateral authentication of the authentication card using either the asymmetric cryptography including reading the first certificate from the authentication card or a third certificate and authenticating the authentication card using the first certificate or the third certificate, or perform a unilateral authentication of the authentication card using the symmetric cryptography; and
require a password entry on the operating unit as a step of the unilateral authentication of the authentication card.

* * * * *